United States Patent [19]

White

[11] Patent Number: 5,303,303
[45] Date of Patent: Apr. 12, 1994

[54] DATA COMMUNICATION SYSTEM USING ENCRYPTED DATA PACKETS

[75] Inventor: Andrew R. White, Harrow on the Hill, United Kingdom

[73] Assignee: GPT Limited, Coventry, England

[21] Appl. No.: 988,112

[22] PCT Filed: Jul. 18, 1991

[86] PCT No.: PCT/GB91/01207

§ 371 Date: Feb. 8, 1993

§ 102(e) Date: Feb. 8, 1993

[87] PCT Pub. No.: WO92/02095

PCT Pub. Date: Feb. 6, 1992

[30] Foreign Application Priority Data

Jul. 18, 1990 [GB] United Kingdom ............... 9015799

[51] Int. Cl.[5] .............................................. H04K 1/00
[52] U.S. Cl. ....................................................... 380/49
[58] Field of Search ................................. 380/23, 49

[56] References Cited

U.S. PATENT DOCUMENTS

| 4,837,822 | 6/1989 | Crosley et al. | 380/23 |
| 4,910,777 | 3/1990 | Larson et al. | 380/49 |

OTHER PUBLICATIONS

ACM Transactions on Computer Systems, vol. 3, No. 1, (Feb. 1985), New York, pp. 1–14, "Secure Communication Using Remote Procedure Calls".

Proceedings of IEEE, vol. 71, No. 12, (Dec. 1983), New York, pp. 1334–1340, Day et al., "OSI Reference Model".

*Primary Examiner*—Salvatore Cangialosi
*Attorney, Agent, or Firm*—Lowe, Price, LeBlanc & Becker

[57] ABSTRACT

Data is encrypted for transmission over non-secure communication by providing data with a header and a trailer portion containing the full information as to the sender and recipient of the data so as to form a data packet, incrypting the data packet, and providing a further header and trailer portion to form a further data packet. The further header and trailer only contain information identifying the entry and exit nodes at which the further data packet enters and leaves the non-secure network. On arrival at the exit node the further data packet can be decrypted to reconstruct the original packet which is then conveyed to its destination via a local secure network. Padding non-secure network with dummy messages makes it impossible to identify the presence of genuine traffic between particular nodes of the non-secure network. Thus secure data may be sent via commercial non-secure packet switching networks without indicating its presence.

16 Claims, 7 Drawing Sheets

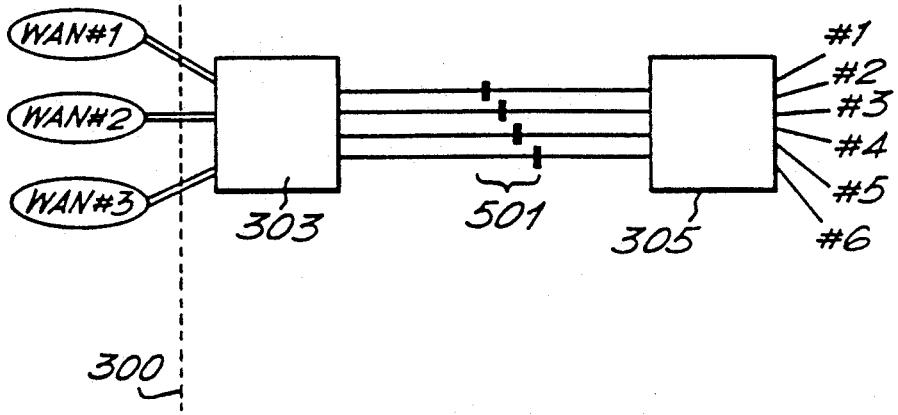
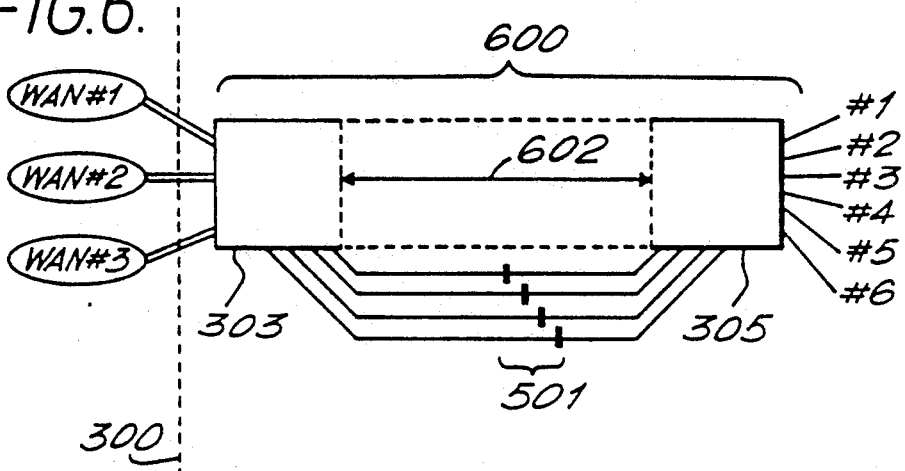
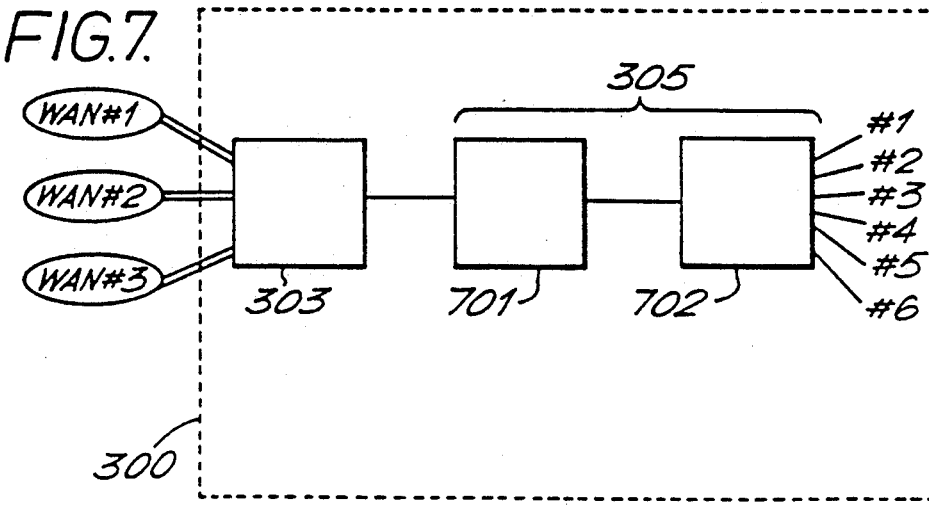

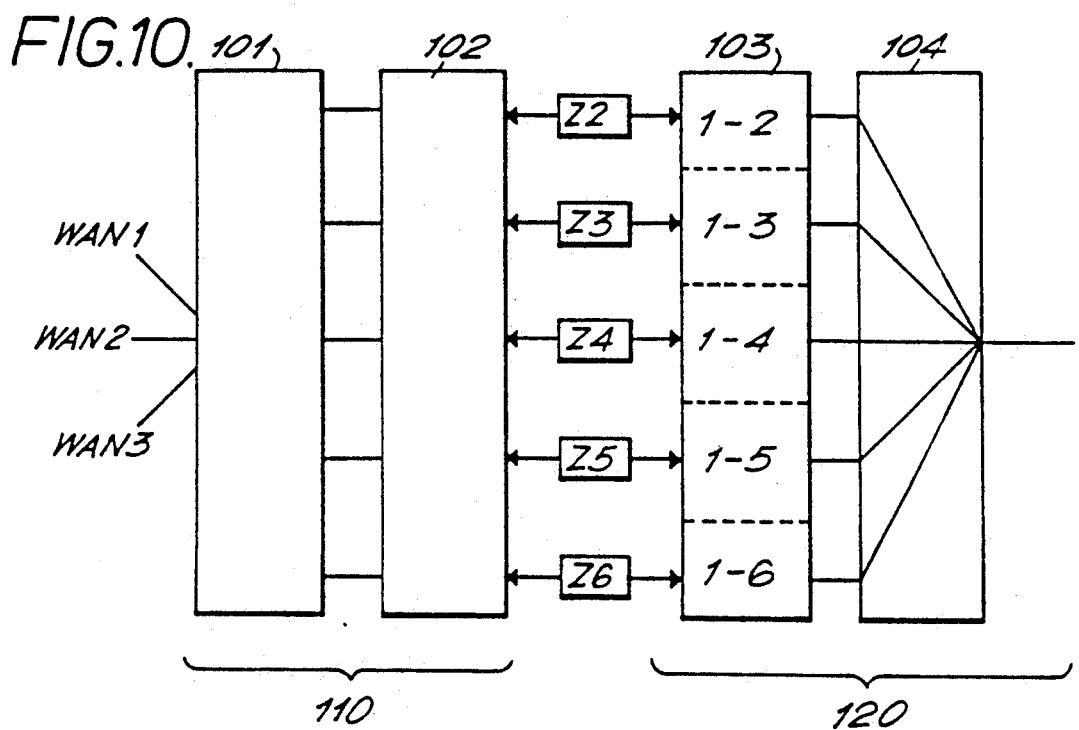
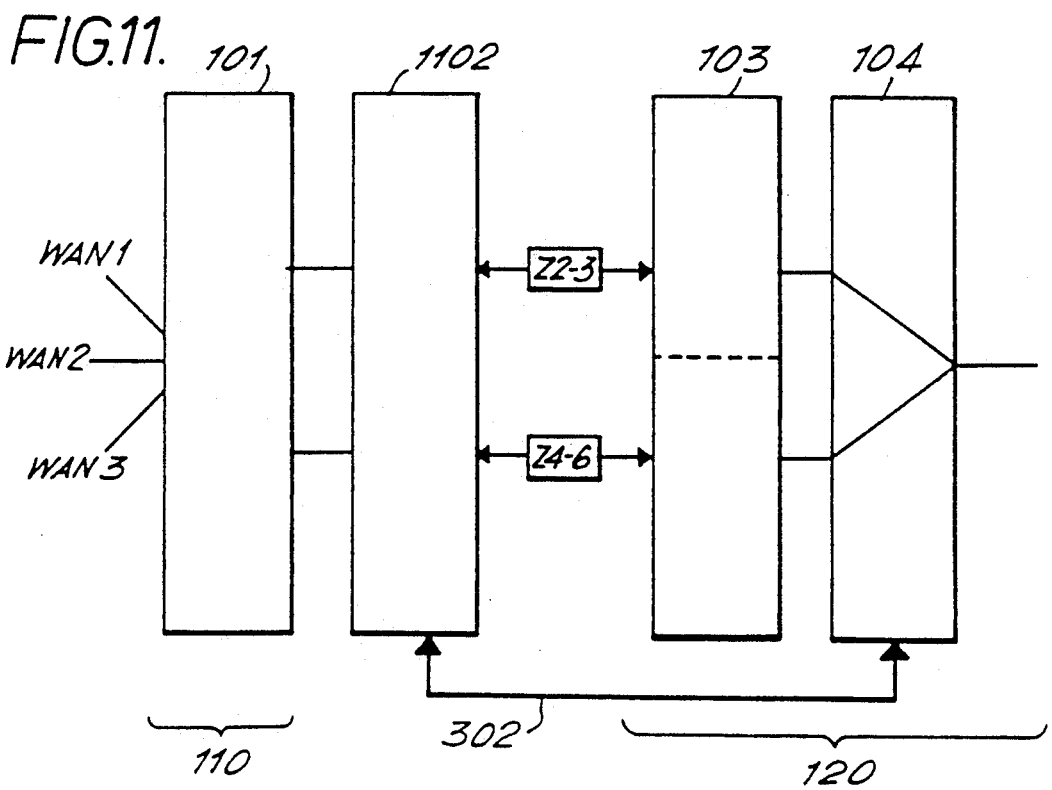

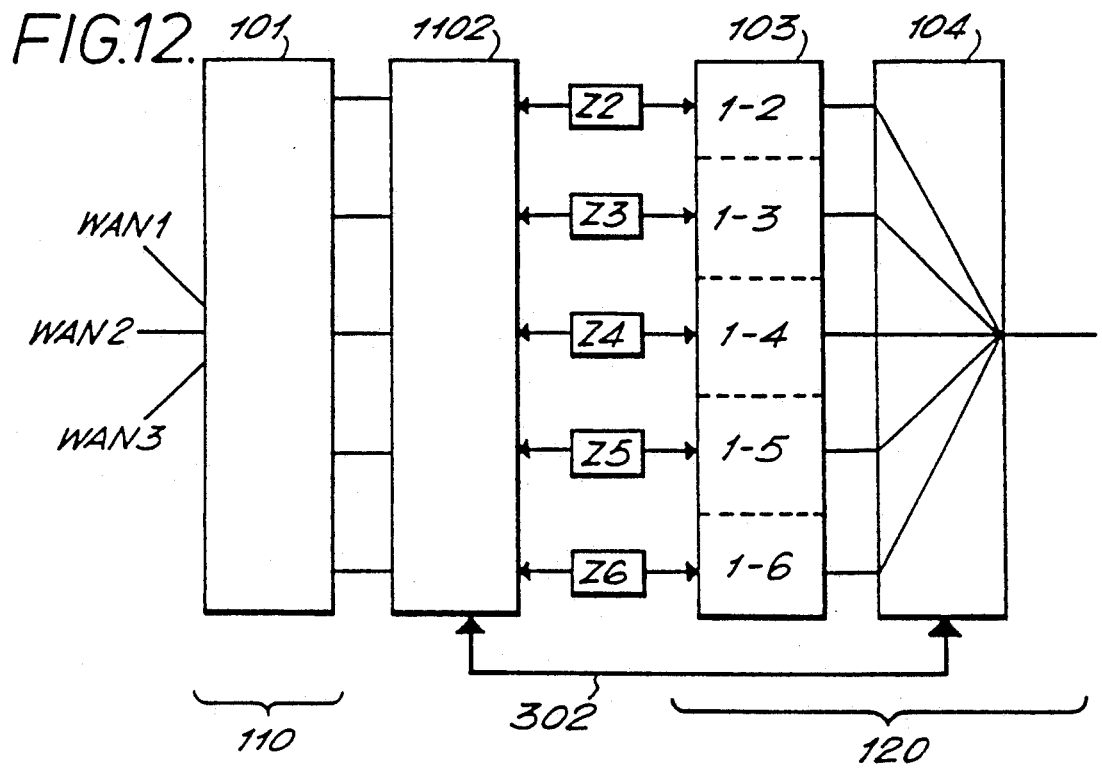
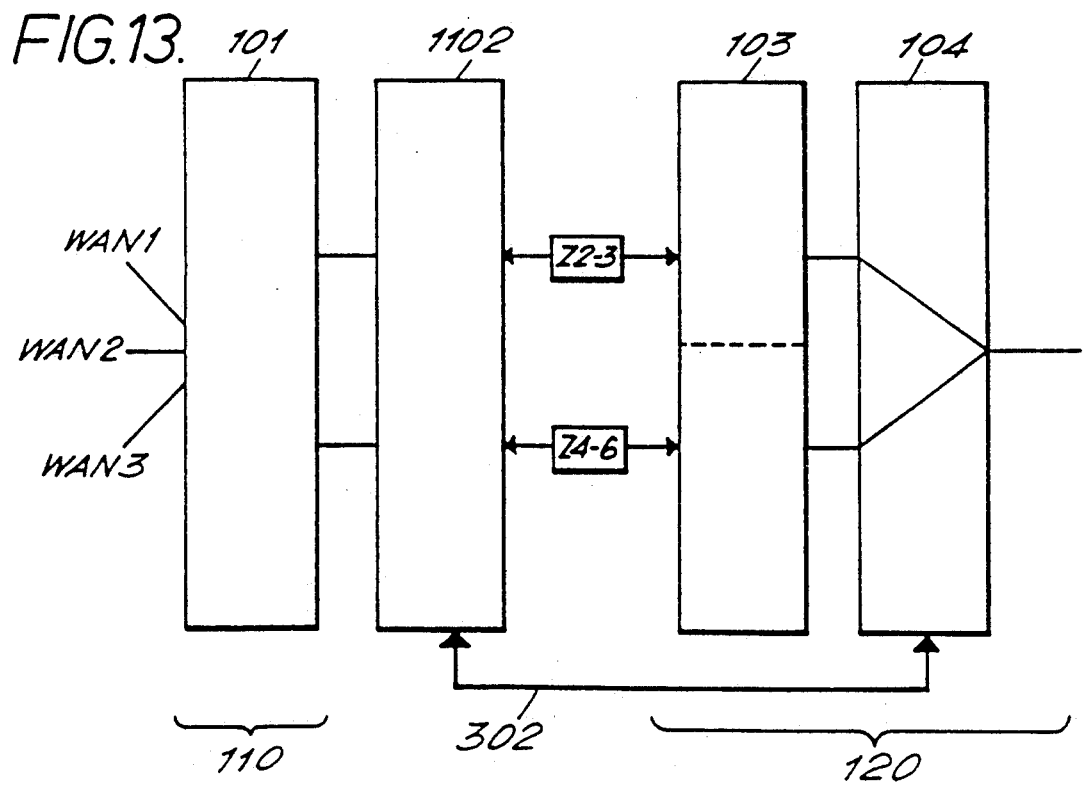

DATA COMMUNICATION SYSTEM USING ENCRYPTED DATA PACKETS

This invention relates to data transmission systems, in particular secure data transmission systems in which data is encrypted for transmission over a non-secure data transmission network such as a packet switching network.

In this specification, the word "data" encompasses digitally-encoded information of any type. It includes, but is not restricted to, alpha-numeric data such as AS-CII; video; teletext; facsimile; speech; and digitally-encoded analogue signals e.g. telemetry In this specification, the word "crypto" has been used as an abbreviation for "encryption device".

As is know to those skilled in the art, in order to transmit data over a packet switching network it is necessary to produce a packet comprising a header portion, a data portion containing data to be transmitted, and a trailer portion. The header portion contains information identifying the destination of the packet, and may contain such additional information as is permitted by the packet switching network protocols, such as call redirection and ringback facilities. Where the data to be transmitted needs to be kept secure, it would be possible to encrypt the data per se: however it would not be possible to encrypt the header and trailer data as the packet switching network needs this header and trailer data to allow it to deliver the packet to the correct destination. In certain cases it would be undesirable for any information identifying the originator and/or recipient of the data to be transmitted over non-secure channels. The present invention arose from an attempt to overcome or mitigate these problems.

According to the invention apparatus for encrypting data for transmission over a communications network comprises: means for generating a first packet comprising a header portion, an information - containing portion and a trailer portion, means for encrypting the first packet, and means for generating a second packet comprising a further header portion, the encrypted first packet, and a further trailer portion.

According to a further aspect of the invention a communication system is provided in which data is encoded by such apparatus prior to being transmitted.

In encrypting the first packet, the information-carrying portion may be incrypted separately form the header portion and trailer portion.

The system may comprise a plurality of subscribers connected by a communications network via a plurality of nodes, at least one subscriber being associated with each node. Each node may include means for encrypting data in the manner referred to in the two preceding paragraphs for transmission to another node, and means for decrypting data for transmission to an associated subscriber.

The further header portion need only contain data relating to the encrypting and the decrypting nodes. At least one node may allow communication between a pair of subscribers connected to that node. This avoids the need for those subscribers to use the non-secure communications network when communicating with each other. The header portion may contain information relating to the destination subscriber address. The header portion may also contain other information such as ring-back or redirect calls, or the security classification of the data. In at least one node the means for decrypting data may comprise a crypto bypass. The bypass may be used for non-secure traffic.

At least one node may comprise a respective encryption device for communication between that node and each respective other node. This allows that node to communicate directly with all other nodes, each node having its own code. At least one node may comprise a respective encryption device for communication between that node and at least one respective group of other nodes.

At least one node may comprise means for padding the traffic with dummy information. This ensures that the node is busy at all times, making it difficult to detect when genuine secure traffic is being conveyed.

At least one node may function as an exchange node so that traffic between nodes has to pass via at least one exchange node. This can reduce the number of cryptos required.

According to another aspect of the invention there is provided, apparatus for decrypting a packet received from a communications network, the packet comprising an unencrypted first header portion, an encrypted first data portion, and an unencrypted trailer portion, the encrypted first data portion comprising an encrypted further packet comprising an encrypted second header portion, an encrypted second data portion and an encrypted second trailer portion, the apparatus comprising means to decrypt the encrypted further packet to produce an unencrypted further packet, the unencrypted further packet comprising the unencrypted second header portion, the unencrypted second data portion, and the unencrypted second trailer portion.

According to yet another aspect of the invention a method of encrypting data for transmission over a communications network comprises the steps of:
  (a) generating a first packet comprising a header portion, an information - containing portion and a trailer portion;
  (b) encrypting the first packet;
  (c) generating a second packet comprising a further header portion, the encrypted first packet, and a further trailer portion.

According to a still further aspect of the invention there is provided a method of decrypting a packet received from a communications network, the packet comprising an unencrypted first header portion, an encrypted first data portion, and an unencrypted trailer portion, the encrypted first data portion comprising an encrypted further packet comprising an encrypted second header portion, an encrypted second data portion and an encrypted second trailer portion, the method comprising the steps of:
  (a) extracting the encrypted first data portion from the packet to obtain the encrypted further data packet;
  (b) decrypting the encrypted further data packet;
  (c) generating a decrypted further packet comprising the unencrypted second header portion, the unencrypted second data portion, and the unencrypted second trailer portion.

The invention will now be described in more detail with reference to the drawings in which:

FIGS. 1(a), 1(b) and 1(c) show diagrams illustrating a method of data encryption in accordance with the invention;

FIG. 5 shows a first example of a secure site in accordance with the invention;

FIG. 6 shows a second example of a secure site in accordance with the invention;

FIG. 7 shows a third example of a secure site in accordance with the invention;

FIG. 10 shows a first method of selective encryption in accordance with the invention;

FIG. 11 shows a second method of selective encryption in accordance with the invention;

FIG. 12 shows a third method of selective encryption in accordance with the invention;

FIG. 13 shows a fourth method of selective encryption in accordance with the invention;

The same reference numerals have been used to denote the same features throughout the figures.

A method of encrypting data in accordance with the invention will now be described with reference to FIG. 1. FIG. 1(a) shows in diagrammatic form a data packet suitable for transmitting over a packet switching network. The packet consists of a header portion H, a data portion D, and a trailer portion T. The header portion H contains information identifying the sender of the data and the address of the subscriber to which the data is to be sent. It may also contain additional information such as call redirection etc. In order to make the whole of this information secure, the entire packet is encrypted. In FIG. 1(b), HE, DE, and TE represent the encrypted header, data, and trailer portions respectively. As all the information contained in the packet has been encrypted, the packet cannot now be sent over a conventional packet switching system as it stands because the header information, being encrypted, cannot be understood by the conventional packet switching system. Accordingly this encrypted packet is provided with a further header and trailer, the further header and trailer containing sufficient information to allow the packet to be transmitted from the node at which encryption takes place to a further node at which decryption takes place. The final data packet is shown in FIG. 1(c) in which H' indicates the further header, T$\propto$ indicates the further trailer, and HE, DE, and TE are as in FIG. 1(b).

Figures 1A, 1B, 1C, 2:
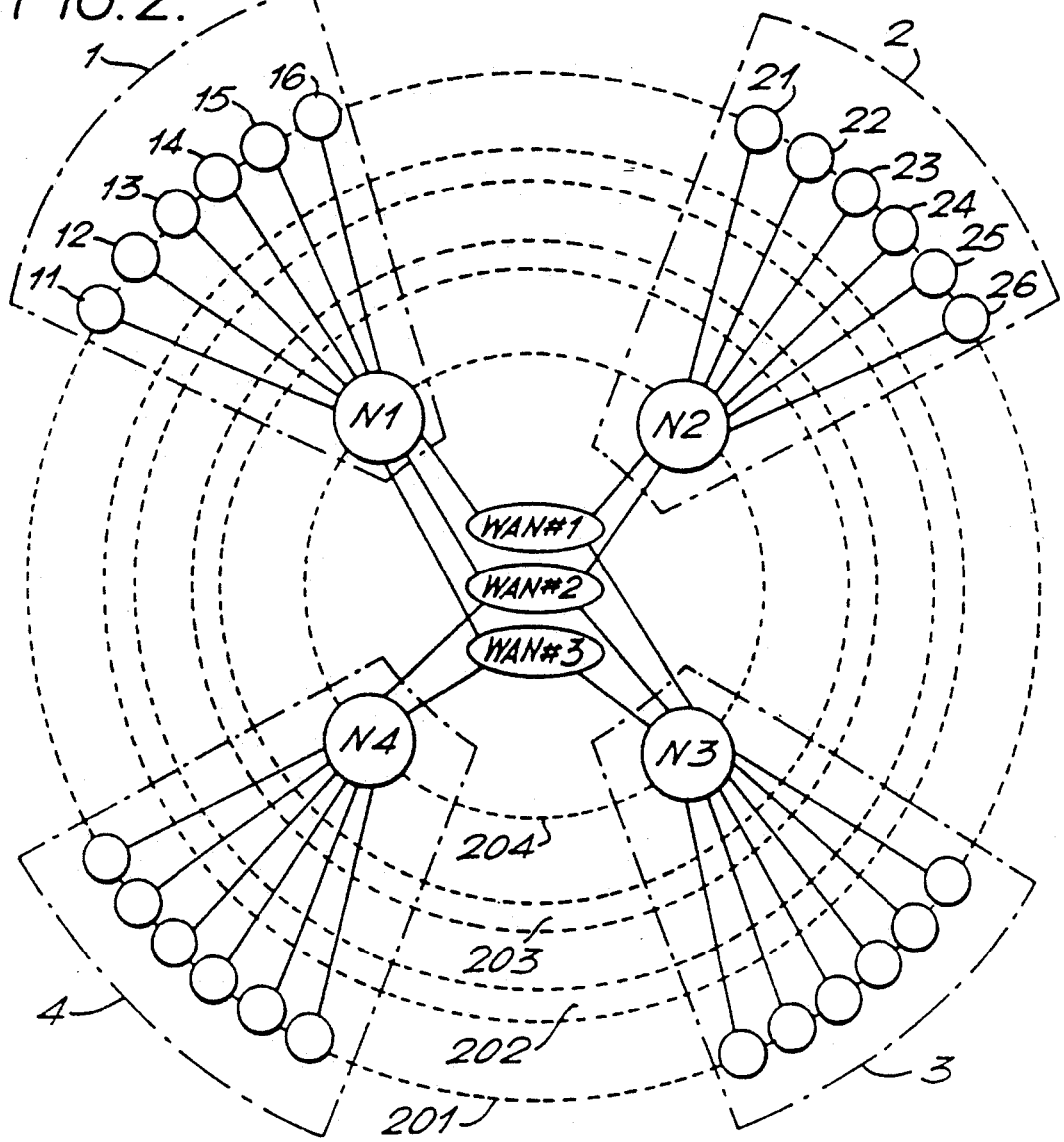
FIG. 2 shows a communication system in accordance with the invention.

FIG. 2 shows a data transmission system in accordance with the invention. Each site 1, 2, 3, 4 is a secure site. The sites are shown diagrammatically in FIG. 2. Each node includes the private MLS access control 202 and the private crypto 203, as well as the public X.25 addresses 204. A site is shown in greater detail in FIG. 3. The concentric circles in FIGS. 2 and 3 indicate the various features of the sites. Site 1 comprises a node N1 to which a number of subscribers 11, 12, 13, 14, 15, 16 are connected. The subscribers have their own private X.25 addresses 201. The node functions as an exchange which provides secure communications between any pair of its subscribers without necessarily requiring encryption It also acts as an interface between the subscribers and a wide area network (WAN) to allow subscribers to communicate with subscribers in other secure sites via their respective nodes by encrypting data prior to transmitting it over the WAN. This is effected by encoding the data prior to transmission in the way described with reference to FIG. 1.

Say a subscriber 11 at site 1 wishes to communicate with subscriber 26 at site 2 A message sent from subscriber 11 arrives at node 1 and is converted into a data packet whose header contains, inter alia, information regarding the End System Address (ESA) of the recipient 26. This data packet is encrypted as described with reference to FIG. 1 to produce a further data packet having a clear (unencrypted) header and trailer This header and trailer only contains Site Address (SA) information, i.e. information identifying the node 1 via which the packet enters the WAN, and the node 2 via which the packet leaves the WAN. On arrival at node 2, the packet is decrypted, and node 2 now forwards the data to the recipient subscriber 26. Should the packet be mis-routed or intercepted during its passage over the WAN, then its unintended recipient will only be able to identify the nodes at which the packet entered and left the WAN, and will not be able to identify the originator or recipient of the data. By ensuring that the system transmits dummy data between nodes in the absence of genuine traffic, an unauthorised recipient would not even be able to gain any useful information as to the amount of traffic passing between pairs of nodes.

Figure 3:
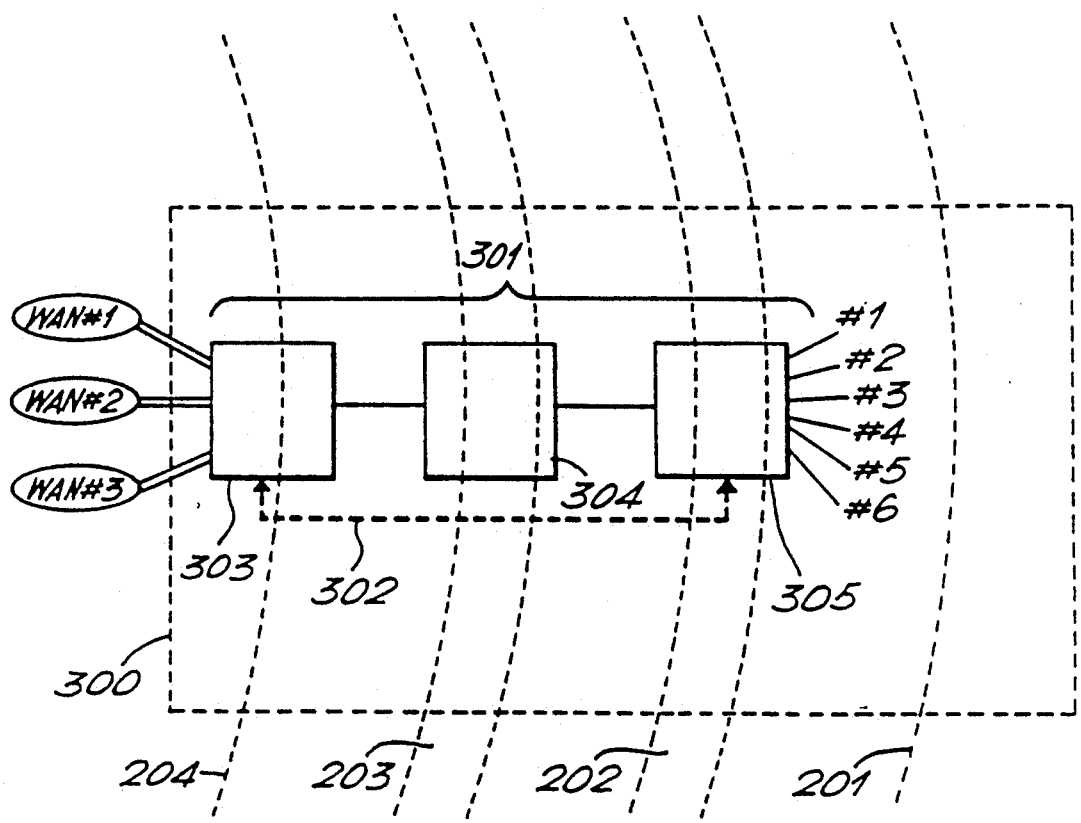
FIGS. 3 and 4 show part of FIG. 2 in more detail.

In the arrangement shown, the provision of a number of alternative WANs provides a high degree of system reliability in that, should one WAN fail, then alternative routes are available via the other WANs. If different WANs have different price structures, it also allows the user to select the most economical route for any particular message FIG. 3 shows a secure site 300 in more detail. The blocks identified as 301 correspond to the nodes of FIG. 2 and allow a two-way flow of information between the private end-systems (subscribers) 1, 2, 3, 4, 5, 6 and the WANs. The optional selective crypto bypass 302 provides a direct route for information such as address and additional functions information which is required to be conveyed directly between the INTERFACE TO PUBLIC WANs 303 and the PRIVATE X.25 ROUTING & ACCESS CONTROL 305 without passing through the PRIVATE ENCRYPTION 304. Such a bypass will in practice only be implemented if it can be ensured that nothing but the address &c. information can be conveyed via the bypass. The Private Routing & Access Control serves to allow the end-systems to communicate with other end-systems at the same site as well as with end-systems at other sites.

Figure 4:
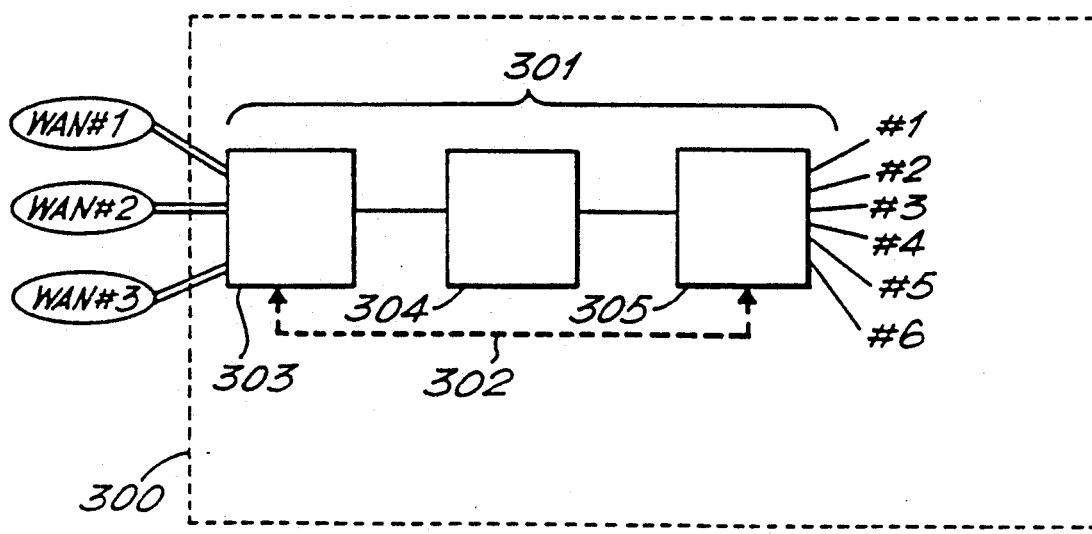

FIG. 4 shows the same information as FIG. 3 but the concentric circles have been omitted for clarity.

FIG. 5 shows a first example of secure site in greater detail. The WAN interface consists of a packet generator/switch which generates packets in a form suitable for transmission over any of WAN1-3, each of which consists of a packet switching network. The PRIVATE X.25 ROUTING & ACCESS CONTROL 305 may be implemented by a suitably programmed computer. A plurality of customer's encryption devices 501 are provided. Each device may serve only one link between the site and one other situ or a single device may be used for a group of two or more sites. Each private end-system (subscriber) 1, 2, 3, 4, 5, 6 has a different security rating. If desired, information concerning this rating may be included in the encrypted header data. Subscriber 1 is "secret high", subscriber 2 is "restricted high", subscriber 3 is "confidential", subscriber 4 is "unclassified to secret (MLS)", subscriber 5 is "confidential to secret (MLS)", subscriber 6 is "top secret".

FIG. 6 shows a second example of a secure site in greater detail. This example includes a crypto bypass 602 for suitable unclassified interactive traffic. This traffic may comprise site address and facilities information. The bracketed functional blocks indicated by 600 may be implemented by a suitably programmed computer such as SCP2 CHESS.

FIG. 7 shows a third example of a secure site in greater detail. Encryption is performed in two stages. SELECTIVE ENCRYPTION 701 encrypts the data only. ROUTING & ACCESS CONTROL 702 performs the remaining tasks.

Figure 8A:
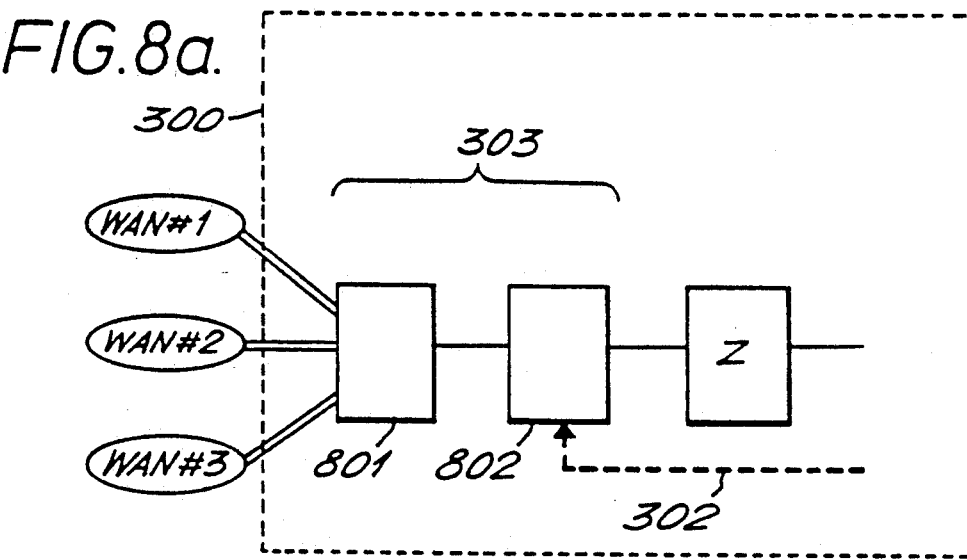
FIGS. 8a and 8b show an example of a secure site in accordance with the invention in more detail.
Figure 8B:
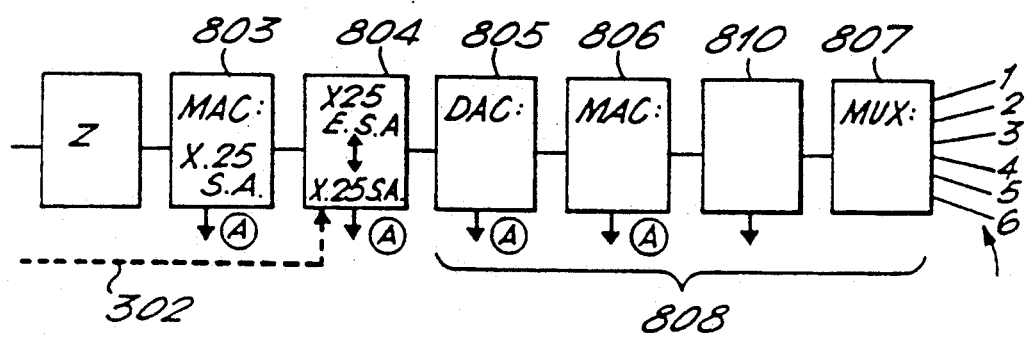

FIGS. 8a and 8b show a secure site in even greater detail. In the following, ESA denotes end system address, and SA denotes site address The interface to public WANs 303 consists of a packet switch 801 and a packet generator 802. Private encryption Z is followed by site-by-site access control 803 comprising mandatory access control X.25 SA to X.25 SA followed by private to public address conversation 804 converting between X.25 ESA and X.25 SA. End-system by end-system access control consists of discretionary access control 805 comprising X.25 ESA to X.25 ESA, and mandatory access control 806 comprising X.25 ESA to X.25 ESA. Traffic padding 810 is followed by individual end system connections 807 comprising MUX labelling. Blocks 805, 806, 807, 810 comprise a c.f. guard 808. To provide greater security, traffic padding 810 is provided to generate dummy messages in the absence of useful information. An audit trail A is generated for analysis of attempted breaches of security. It should be noted that block Z "private encryption" shown in FIG. 8a has been duplicated in FIG. 8b and that the site only has one such block.

Figure 9:
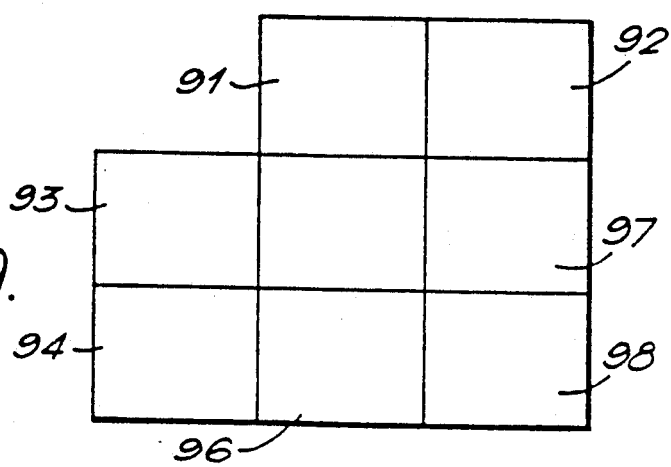
FIG. 9 shows diagramatically four methods of selective encryption.

FIG. 9 illustrates in diagrammatic form various methods of selective encryption in accordance with the invention, which methods are illustrated in detail in FIGS. 10–13.

91 denotes "without negotiable network facilities"
92 denotes "with negotiable network facilities"
93 denotes "separate crypto-pairs"
94 denotes "shared crypto"
95 denotes method 1
96 denotes method 2
97 denotes method 3
98 denotes method 4

FIGS. 10 to 13 each show one site, denoted site 1 in each case, of a system consisting of six sites.

FIG. 10 illustrates a site in accordance with method 1. Each inter-site link is allocated its own crypto. The cryptos are indicated by Z2 to Z6, Z2 being used for communication between sites 1 and 2, and so on. 101 is a packet switch exchange, 102 a packet generator, 103 is site address control, 104 address conversion, 110 are untrusted, 120 are trusted units. This has the advantage of having no crypto bypass and being more secure (chain block cypher). It has the disadvantage of requiring more crypto devices.

FIG. 11 illustrates a site in accordance with method 2. Only two cryptos are provided, Z2-3 being used for communication between site 1 and both sites 2 and 3, Z4-6 being used for communication between site 1 and the remaining sites. While this uses fewer cryptos, it does necessitate the provision of a crypto bypass for conveying the site address information. Packet generator 1102 may be either trusted or untrusted.

FIG. 12 illustrates a site in accordance with method 3. This is similar to FIG. 10 in that each inter-site link has its own crypto, but a crypto bypass 302 is provided for network facilities Network facilities are available, but a large number of cryptos are needed and the crypto bypass has to be verified.

FIG. 13 illustrates a site in accordance with method 4. This is similar to FIG. 11, but the crypto bypass 302 conveys both site address and network facilities information. This uses fewer cryptos and network facilities are available, but the crypto bypass has to be verified.

FIG. 14 illustrates different types of selective encryption.

Figure 14A:
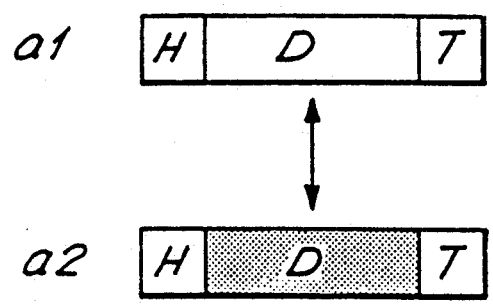
FIG. 14a and 14b show diagram illustrating methods of data encryption.

FIG. 14a illustrates encoding in which only the data portion D of a packet a1 is encoded to produce an encoded packet a2. This allows only minimal X.25 facilities.

Figure 14B:
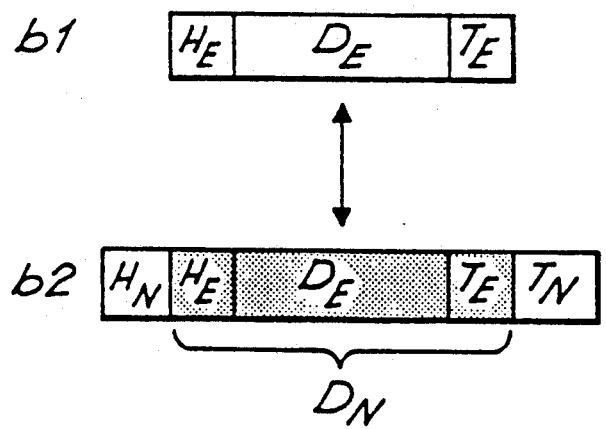

FIG. 14b illustrates encoding in accordance with the invention. The whole of the packet b1 is encoded to produce a further packet b2 whose data portion DN is an encoded representation of the data portion DE of the original packet. This allows full X.25 packet switching protocol facilities.

In the arrangements described so far, any given node has been able to communicate directly with any other node. While this allows maximum system flexibility, it does suffer the disadvantage of requiring a large number of cryptos, and this number increases rapidly as more nodes are connected to the network. The number of cryptos can be considerably reduced by using a small number of nodes as exchanges such that communication between nodes has to be routed via one or more of these exchange nodes. It is then only necessary to provide each node with a crypto which will allow it to communicate with its exchange node or nodes. Thus in FIG. 2, node 1 could be the designated exchange node, and all secure traffic between nodes 2, 3 and 4 would be routed via node 1 Alternatively nodes 1 and 2 could be designated exchange nodes so that direct secure communication between nodes 3 and 4 was not possible However, nodes 3 and 4 could communicate either via node 1 or via node 2, or indeed via both node 1 and node 2. This would allow an increased degree of flexibility and reliability over a single exchange system, as the system could still function in the event of failure of one of the exchange nodes. Provision could be made to permit non-secure traffic to be routed directly between nodes rather than passing via a secure traffic exchange node.

Management facilities available in conjunction with the invention include:
  setting access control permissions, archiving audit trails;
  choice of - central facility with local fallback;
    local facility mandated for some users or sites;
  central facility collates user directory except 'ex-directory' users or sites;
  choice of several central facilities for survivability;
  independent survivable central facilities for each subgroup of sites;
  CHESS management data/commands use main data network (preserving 'trusted path').

Arrangements in accordance with the invention may be implemented with the use of suitably programmed secure computers such as SCP2 CHESS to effect the necessary encoding and decoding. This is particularly advantageous, as it facilitates subsequent reconfiguration of the system, for example, to accommodate additional sites and additional facilities. It provides a secure communication link between sites over existing non-secure communications networks, thereby avoiding the need for, and expense of, a discrete dedicated secure network, and allows all the encryption and decrypting arrangements to be located on-site.

The invention may be used in any application, including business and military communications, in which it is essential that information be securely and reliably transmitted between sites.

The invention may be used in conjunction with single-level, system high, or multi-level end systems. Systems in accordance with the invention may be certified to recognized assurance levels.

While the invention has been described with reference to the embodiments shown in the drawings, it is not restricted to the particular embodiments shown. For example, although communication between sites is described as being possible via one of a plurality of WANs, it is only necessary that at least one WAN be present. Further, communications networks other than WANs may be used, for example LANs or broadcast communications networks Further, the invention is not restricted to communication using packet switching networks, but can be used with any other communication system in which information to be conveyed is associated with information indicating the destination and/or origin of the information. Further, while the clear header has been described as containing only site address information, it may be possible in some circumstances to include additional information. Further, while the header has been described as containing site address information and possibly additional information, at least some of this information could be contained in the trailer. Further, while methods in accordance with the invention have been described as a sequence of steps, at least some of these steps may be performed simultaneously rather than sequentially.

Further, it may not be necessary for every data packet of a transmission to be provided with information regarding the entry and exit nodes of the communications network and the recipient of the data. It may only be necessary for the initial packet or packets of the transmission to contain the routing information necessary to establish a communications link between subscribers. Once the link has been established, some or all of this routing information can be omitted from subsequent packets, the subsequent packets being conveyed over the link so established for the duration of the transmission.

I claim:

1. Apparatus for encrypting data for transmission over a communications network comprising:
   means for generating a first packet comprising a header portion, an information - containing portion and a trailer portion;
   means for encrypting the first packet; and
   means for generating a second packet comprising a further header portion, the encrypted first packet, and a further trailer portion.

2. Apparatus as claimed in claim 1 in which the means for encrypting the first packet encrypts the information - containing portion separately from the header portion and trailer portion.

3. A communications system comprising a plurality of subscribers connected by a communications network via a plurality of nodes, at least one subscriber being associated with each node; each node including apparatus for encrypting data as claimed in claim 1 for transmission to another node and means for decrypting data for transmission to an associated subscriber.

4. A system as claimed in claim 3 in which the further header portion contains data relating to the encrypting and the decrypting nodes.

5. A system as claimed in claim 3 in which at least one node also allows communication between a pair of subscribers connected to that node.

6. A system as claimed in claim 3 in which the header portion contains information relating to the destination subscriber address.

7. A system as claimed in claim 6 in which the header portion also contains other information.

8. A system as claimed in claim 3 in which for at least one node the means for decrypting data comprises a crypto bypass.

9. A system as claimed in claim 3 in which at least one node comprises a respective encryption device for communication between the one node and each respective other node.

10. A system as claimed in claim 3 in which at least one node comprises a respective encryption device for communication between the one node and at least one respective group of other nodes.

11. A system as claimed in claim 3 in which at least one node comprises traffic padding means.

12. A system as claimed in claim 3 in which at least one node functions as an exchange node such that encrypted traffic between nodes is routed via at least one exchange node.

13. Apparatus for decrypting a packet received from a communications network, the packet comprising an unencrypted first header portion, an encrypted first data portion, and an unencrypted trailer portion, the encrypted first data portion comprising an encrypted further packet comprising an encrypted second header portion, an encrypted second data portion and an encrypted second trailer portion, the apparatus comprising means to decrypt the encrypted further packet to produce an unencrypted further packet, the unencrypted further packet comprising the unencrypted second header portion, the unencrypted second data portion, and the unencrypted second trailer portion.

14. A method of encrypting data for transmission over a communications network comprising the steps of:
   (a) generating a first packet comprising a header portion, an information - containing portion and a trailer portion;
   (b) encrypting the first packet;
   (c) generating a second packet comprising a further header portion, the encrypted first packet, and a further trailer portion.

15. A method as claimed in claim 14 in which in step (b) the information - containing portion is encrypted separately from the header portion and trailer portion.

16. A method of decrypting a packet received from a communications network, the packet comprising an unencrypted first header portion, an encrypted first data portion, and an unencrypted trailer portion, the encrypted first data portion comprising an encrypted further packet comprising an encrypted second header portion, an encrypted second data portion and an encrypted second trailer portion, the method comprising the steps of:
   (a) extracting the encrypted first data portion from the packet to obtain the encrypted further data packet;
   (b) decrypting the encrypted further data packet;
   (c) generating a decrypted further packet comprising the unencrypted second header portion, the unencrypted second data portion, and the unencrypted second trailer portion.

* * * * *